US012657686B2

(12) United States Patent
Lee et al.

(10) Patent No.: US 12,657,686 B2
(45) Date of Patent: Jun. 16, 2026

(54) LINE DEFECT DETECTION

(71) Applicant: Nanotronics Imaging, Inc., Cuyahoga Falls, OH (US)

(72) Inventors: Joanna Lee, Brooklyn, NY (US); Jacob Keith, Brooklyn, NY (US); Anuj Doshi, Long Island City, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 307 days.

(21) Appl. No.: 18/586,137

(22) Filed: Feb. 23, 2024

(65) Prior Publication Data

US 2025/0272822 A1     Aug. 28, 2025

(51) Int. Cl.
| | |
|---|---|
| *G06V 10/00* | (2022.01) |
| *G06T 7/00* | (2017.01) |
| *G06V 10/764* | (2022.01) |
| *G06V 20/70* | (2022.01) |

(52) U.S. Cl.
CPC .......... *G06T 7/0008* (2013.01); *G06V 10/764* (2022.01); *G06V 20/70* (2022.01); *G06T 2207/20081* (2013.01)

(58) Field of Classification Search
CPC ........ G06N 20/00; G06N 20/10; G06N 20/20; G06V 10/764; G06V 10/82; G06V 10/761; G06V 10/765; G06V 10/7715; G06T 7/0008; G06T 2207/20081; G06T 2207/20084
See application file for complete search history.

(56) References Cited

U.S. PATENT DOCUMENTS

| | | | | |
|---|---|---|---|---|
| 11,308,358 | B2 * | 4/2022 | Van Oldenborgh | ........................ G06V 10/225 |
| 11,354,793 | B2 * | 6/2022 | Xu | ..................... G06V 10/7784 |
| 11,379,967 | B2 * | 7/2022 | George | ................. G06T 7/0004 |
| 11,531,829 | B2 * | 12/2022 | Murugaraj | .............. G06F 18/22 |
| 11,720,623 | B2 * | 8/2023 | Liu | ........................... G06T 7/136 |
| 11,836,972 | B2 * | 12/2023 | Jonnalagedda | ...... G06V 10/273 |
| 2023/0394801 | A1 | 12/2023 | Doshi et al. | |

(Continued)

FOREIGN PATENT DOCUMENTS

| | | |
|---|---|---|
| TW | I714923 | 1/2021 |
| WO | 2023053029 A1 | 4/2023 |

OTHER PUBLICATIONS

Leung, "TW 202348984 A , method for detecting defect, electronic device and storage", Date published Dec. 16, 2023.*

(Continued)

*Primary Examiner* — Amir Alavi
(74) *Attorney, Agent, or Firm* — DLA Piper LLP (US)

(57) ABSTRACT

A computing system generates a training data set for training a machine learning model to detect line defects on a surface of a specimen. The computing system trains the machine learning model to detect line defects based on the training data set. The machine learning model is trained to detect line defects by detecting the individual defects represented by the plurality of annotations extending between the starting point and the end point. The computing system determines that the machine learning model has exceeded a threshold level of accuracy. Based on the determining, the computing system deploys the machine learning model to detect line defects on future specimens.

20 Claims, 7 Drawing Sheets

200

(56)                References Cited

U.S. PATENT DOCUMENTS

2025/0272822 A1 *   8/2025   Lee ........................ G06V 20/70

OTHER PUBLICATIONS

Office Action of TW Application No. 114106723, dated Dec. 18, 2025, 9 pages.
International Search Report and Written Opinion for Application No. PCT/US2025/016828, mailed on Apr. 30, 2025, 16 Pages.

* cited by examiner

LINE DEFECT DETECTION

TECHNICAL FIELD

Embodiments disclosed herein generally relate to systems and methods for detecting line defects on a specimen.

BACKGROUND

Inspection of specimens, such as ceramics, metals, glass, or electronics, for defects and other characteristics is important for manufacturing processes. A defect, such as a line defect, may often be formed on the surface of a specimen. The line defect may be formed during the manufacturing process and is important to detect. Some of these defects are generally longer than other types of defects and may be seen in a single field of view of an imaging system or may span multiple fields of views. In some embodiments, the defect is continuous, i.e., connected, and may be straight or contain curves and/or angles. More generally, this type of defect may be thought of as a defect that is much longer in one dimension than in any other dimensions. The defects as described herein will be referred to as line defects.

SUMMARY

In some embodiments, a method is disclosed herein. A computing system generates a training data set for training a machine learning model to detect line defects on a surface of a specimen. The generating includes causing an annotation interface to be displayed to a user via a user device of the user, the annotation interface configured for receiving annotations indicating a presence of a defect, causing presentation of a plurality of training images via the annotation interface on the user device, wherein each training image of the plurality of training images comprises a line defect, and receiving annotated images from the user device via the annotation interface, wherein each line defect is annotated using a plurality of annotations that extend between a starting point of the line defect to an end point of the line defect, wherein the annotated images form the training data set. The computing system trains the machine learning model to detect line defects based on the training data set. The machine learning model is trained to detect line defects by detecting the individual defects represented by the plurality of annotations extending between the starting point and the end point. The computing system determines that the machine learning model has exceeded a threshold level of accuracy. Based on the determining, the computing system deploys the machine learning model to detect line defects on future specimens.

In some embodiments, a system is disclosed herein. The system includes a processor and a memory. The memory has programming instructions stored thereon, which, when executed by the processor, causes the system to perform operations. The operations include generating a training data set for training a machine learning model to detect line defects on a surface of a specimen. The generating includes causing an annotation interface to be displayed to a user via a user device of the user, the annotation interface configured for receiving annotations indicating a presence of a defect, causing presentation of a plurality of training images via the annotation interface on the user device, wherein each training image of the plurality of training images comprises a line defect, and receiving annotated images from the user device via the annotation interface, wherein each line defect is annotated using a plurality of annotations that extend between a starting point of the line defect to an end point of the line defect, wherein the annotated images form the training data set. The operations further include training the machine learning model to detect line defects based on the training data set. The machine learning model is trained to detect line defects by detecting the individual defects represented by the plurality of annotations extending between the starting point and the end point. The operations further include determining that the machine learning model has exceeded a threshold level of accuracy. The operations further include, based on the determining, deploying the machine learning model to detect line defects on future specimens.

In some embodiments, a non-transitory computer readable medium is disclosed herein. The non-transitory computer readable medium has one or more sequences of instructions stored thereon, which, when executed by a processor, causes a computing system to perform operations. The operations include generating, by the computing system, a training data set for training a machine learning model to detect line defects on a surface of a specimen. The generating includes causing an annotation interface to be displayed to a user via a user device of the user, the annotation interface configured for receiving annotations indicating a presence of a defect, causing presentation of a plurality of training images via the annotation interface on the user device, wherein each training image of the plurality of training images comprises a line defect, and receiving annotated images from the user device via the annotation interface, wherein each line defect is annotated using a plurality of annotations that extend between a starting point of the line defect to an end point of the line defect, wherein the annotated images form the training data set. The operations further include training, by the computing system, the machine learning model to detect line defects based on the training data set. The machine learning model is trained to detect line defects by detecting the individual defects represented by the plurality of annotations extending between the starting point and the end point. The operations further include determining, by the computing system, that the machine learning model has exceeded a threshold level of accuracy. The operations further include, based on the determining, deploying, by the computing system, the machine learning model to detect line defects on future specimens.

BRIEF DESCRIPTION OF THE FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1B:
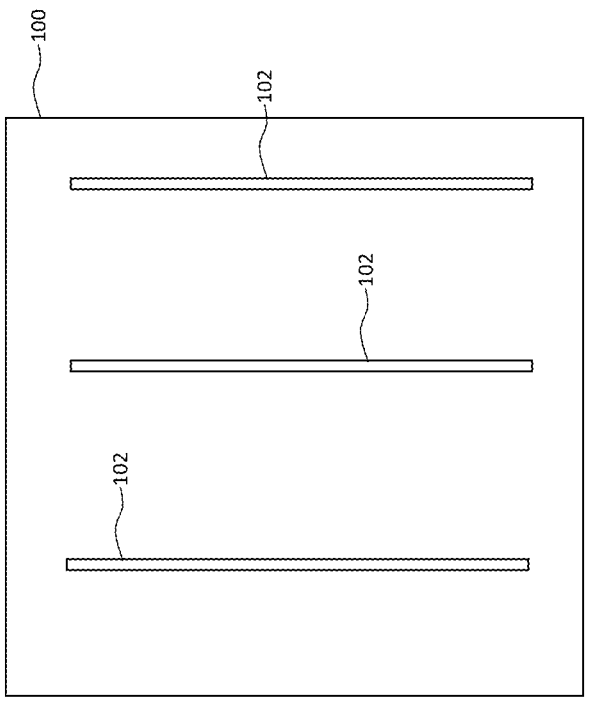
FIG. 1B illustrates a top view of a specimen with a line defect, according to example embodiments of the present disclosure.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

The present disclosure is directed to relate to systems and methods for detecting line defects on a specimen using a trained machine learning model.

Typically, an image taken of the specimen may be annotated for training models to detect such defects. The annotated images, which may be referred to as tagged data, is an important source of information for image classifiers or object detectors, such as deep learning-based models in artificial intelligence (AI). U.S. Pat. No. 11,727,672, which is incorporated by reference, describes generating training sets for training a machine learning model to detect defects on a specimen.

As those skilled in the art understand, in order to utilize machine learning or artificial intelligence to detect defects on a surface of a specimen, the machine learning or artificial intelligence model needs to be trained to detect such defects. Because line defects are typically longer in length than other defects and may span an entire length of a field of view of an imaging device when under inspection, traditional image annotation techniques for generating a labeled data set to train the machine learning or artificial intelligence model to detect line defects are not as effective. For example, if a line starts to extend beyond a threshold percentage of the field of view (e.g., 33%), the conventional method of annotating line defects becomes less useful, especially if the orientation of the line is angled relative to the angle of the image's pixel grid.

Conventional annotation techniques for labeling line defects include image segmentation. Image segmentation typically requires a user to assign a label to every pixel in an image of a specimen. As those skilled in the art understand, this process is often time consuming and strenuous as the user needs to manually label every individual pixel in the image. Additionally, using conventional annotation techniques to draw a bounding box or shape around the line defect is often futile because the line defect typically spans an entire field of view of the camera or imaging device capturing an image of the specimen.

One or more techniques described herein provide an improved approach for training a machine learning model to detect and/or classify line defects on specimens. For example, one or more techniques described herein provide an improved method for labeling line defects on images of specimens to generate a robust training data set for training a machine learning model to detect these defects.

Figure 1A:
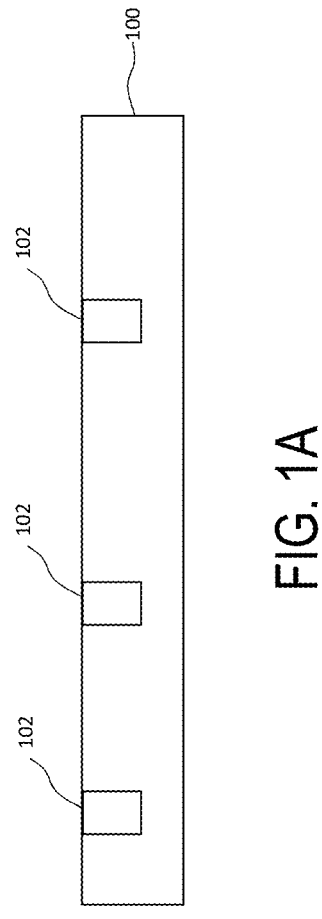
FIG. 1A illustrates a cross-section of a specimen with a line defect, according to example embodiments of the present disclosure.

FIG. 1A illustrates a cross-section of a specimen 100 with a line defect 102, according to example embodiments. FIG. 1B illustrates a top view of a specimen 100 with a line defect 102, according to example embodiments.

A line defect 102 may be formed on the surface of a specimen 100. In some embodiments, the line defect 102 is a groove. The shape of groove may be a V-shape or a U-shape. The line defect 102 may be formed from one or more lithography and etching operations, mechanical scratching by a diamond tip, by laser etching, or the like. In some embodiments, a depth of the line defect may be in a range from about 20 nm to about 1000 nm. In some embodiments, a depth of the line defect may be in a range from about 100 nm to about 500 nm. In some embodiments, the line defect 102 may span the entire field of view. Accordingly, a given line defect 102 may have parameters associated therewith, such as a length of the line defect, a depth of the line defect, a shape of the line defect, etc.

Figure 2:
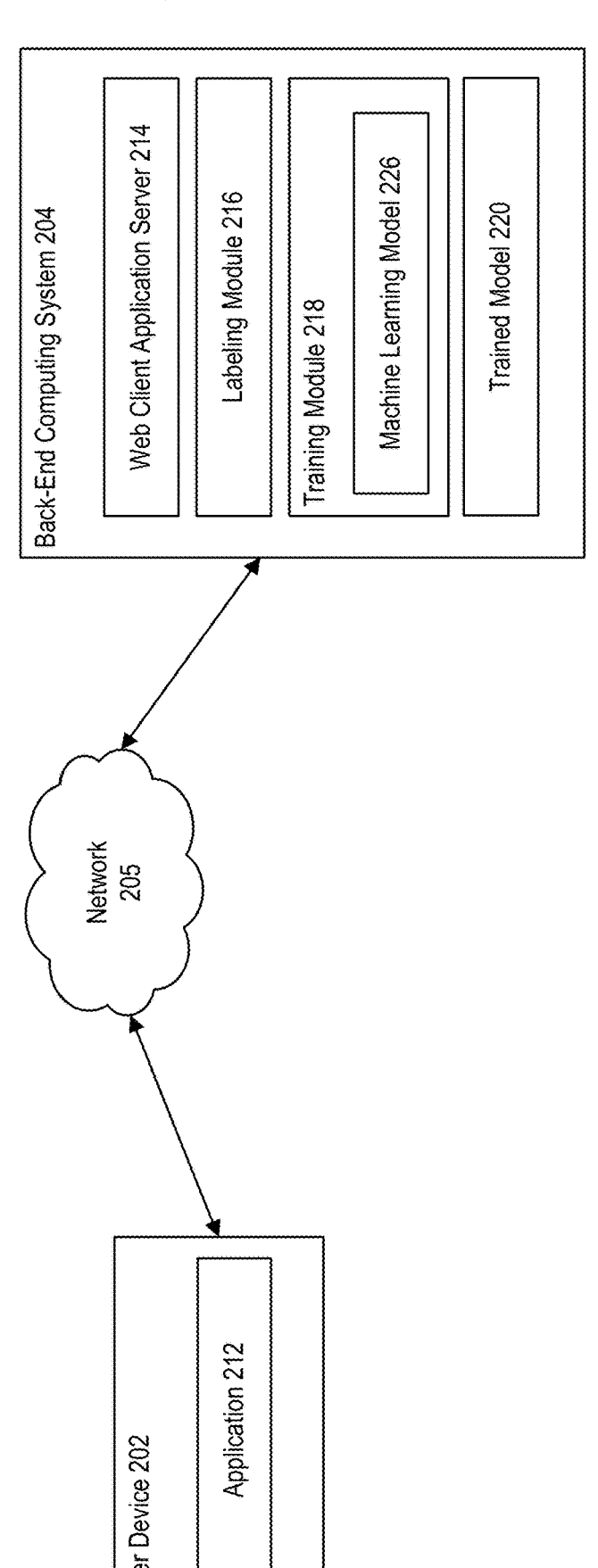
FIG. 2 is a block diagram illustrating an exemplary computing environment, according to example embodiments of the present disclosure.

FIG. 2 is a block diagram illustrating an exemplary computing environment 200, according to example embodiments.

Computing environment 200 may include at least one or more user devices 202 and a back-end computing system 204 communicating via network 205.

Network 205 may be of any suitable type, including individual connections via the Internet, such as cellular or Wi-Fi networks. In some embodiments, network 205 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 205 may include any type of computer networking arrangement used to exchange data. For example, network 205 may be the Internet, a private data network, virtual private network using a public network and/or other suitable connection(s) that enables components in computing environment 200 to send and receive information between the components of computing environment 200.

User device 202 may be operated by a user. In some embodiments, user device 202 may be operated by a user involved in the generation of training data for a machine learning model. User device 202 may be representative of a mobile device, a tablet, a desktop computer, or any computing system having the capabilities described herein. For example, user device 202 may be representative of a mobile device, a tablet, a desktop computer, or any computer system that allows the user to draw shapes and figures on the image, for example, by using an input device, such as, but not limited to, a keyboard, a finger, a mouse, or a stylus.

User device 202 may include at least application 212. Application 212 may be representative of an application associated with back-end computing system 204. In some embodiments, application 212 may be a standalone application associated with back-end computing system 204. In some embodiments, application 212 may be representative of a web browser configured to communicate with back-end computing system 204. In some embodiments, user device 202 may communicate over network 205 to request a webpage, for example, from web client application server 214 of back-end computing system 204. For example, user device 202 may be configured to execute application 212 to label training data for a machine learning model. For example, via application 212, a user may utilize touchscreen capability of user device 202 to annotate images for training a machine learning model.

The content that is displayed to user device 202 may be transmitted from web client application server 214 to user device 202, and subsequently processed by application 212 for display through a graphical user interface (GUI) of user device 202.

Back-end computing system 204 may include web client application server 214, labeling module 216, and training module 218. Each of data labeling module 216 and training module 218 may be comprised of one or more software modules. The one or more software modules are collections of code or instructions stored on a media (e.g., memory of back-end computing system 204) that represent a series of machine instructions (e.g., program code) that implements one or more algorithmic steps. Such machine instructions may be the actual computer code the processor of back-end computing system 204 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

As stated above, application 212 may allow users to manually annotate an image for the purpose of generating training data to train a machine learning model. Labeling module 216 may be configured to provide user device 202 with a plurality of images of specimens for defect labeling. Generally, the plurality of images of specimens for defect labeling may include at least a line defect present thereon. In some embodiments, the plurality of images of specimens may include other defects present thereon.

Via application 212, a user of user device 202 may manually annotate the plurality of images provided by labeling module 216 to identify defects that are present in the image of the specimen. As indicated above, the labeling of a line defect is typically difficult, due to the length of line defects. Accordingly, to improve upon the labeling process, a user of user device 202 may label a line defect using a plurality of annotations along a length of the line defect. For example, across the length of a line defect, a user may draw a plurality of annotations. In this manner, when the labeled image is used to train machine learning model 226, the annotations may trick the machine learning model 226 to detect a line defect by detecting a plurality of individual defects across a length of the line defect.

In some embodiments, the plurality of annotations may overlap. For example, for n-annotations across a length of a line defect, annotation 1 may overlap with annotation 2, annotation 2 may overlap with annotation 3, and so on. In some embodiments, the plurality of annotations may not overlap.

Figure 5A:
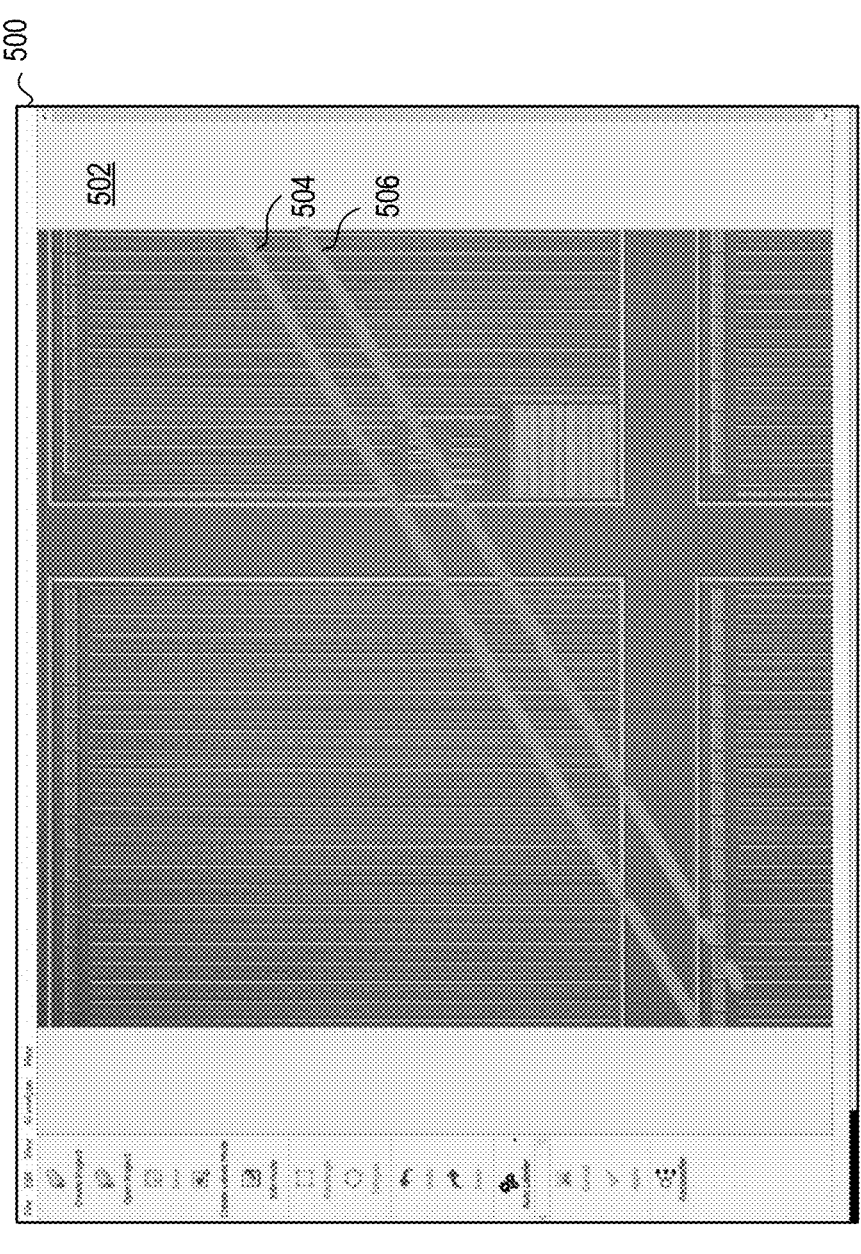
FIG. 5A is an exemplary screenshot illustrating an annotated line defect, according to example embodiments.
Figure 5B:
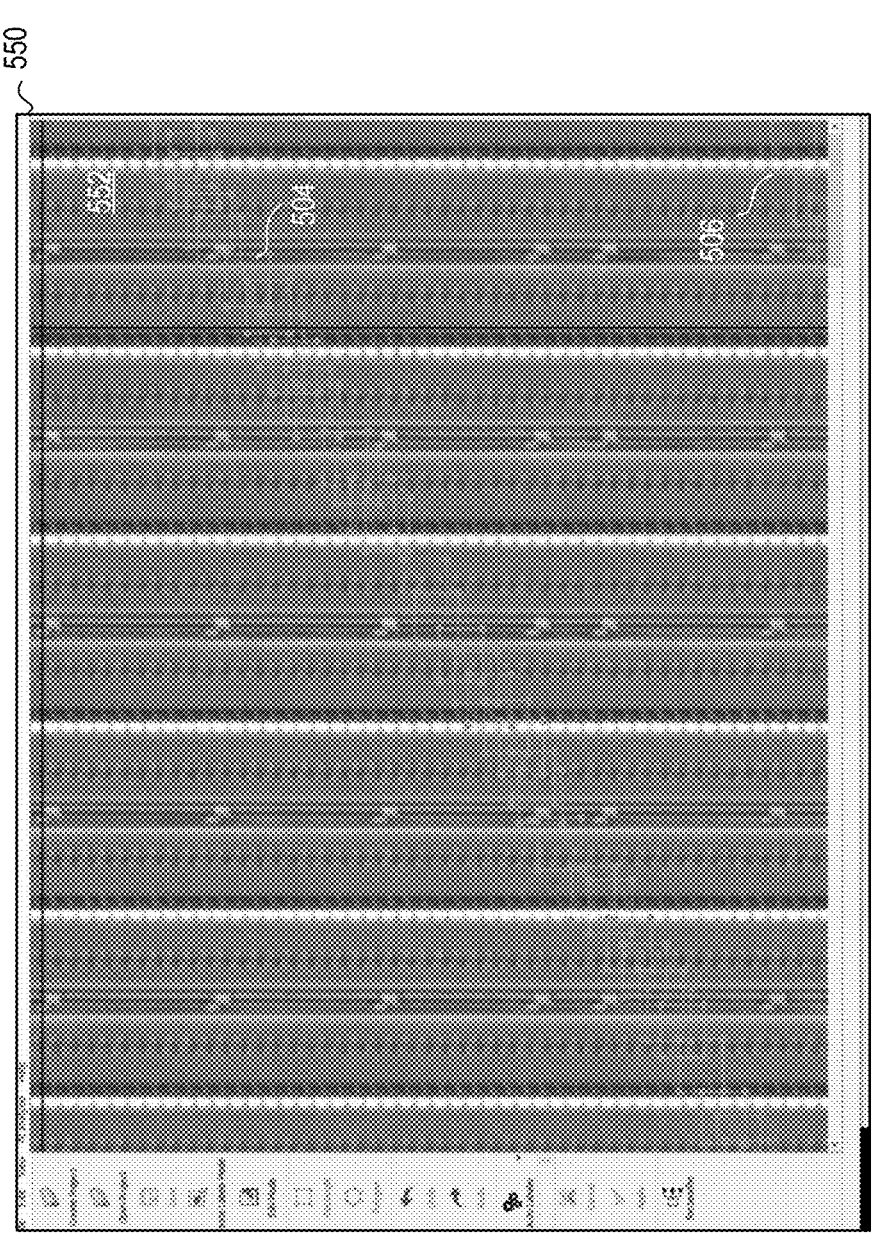
FIG. 5B is an exemplary screenshot illustrating a zoomed out view of the annotated line defect of FIG. 5A, according to example embodiments.

FIG. 5A and FIG. 5B are exemplary screenshots 500, 550 illustrating an annotated line defect, according to example embodiments. As shown in FIG. 5A, screenshot 500 includes an annotation area 502. Via annotation area 502, an end user may annotate an image of a specimen to signal the existence of line defects present thereon. As shown, annotation area 502 includes two groupings of annotations signaling a first line defect 504 and a second line defect 506.

FIG. 5B includes an annotation area 552. The specimen shown in annotation area 552 is a zoomed out version of the specimen, with first line defect 504 and second line defect 506. As shown, although it appears in FIG. 5A that there are two long lines that have been annotated, when the image is zoomed out, it becomes clear that the two line defects 504, 506 have been annotated using a plurality of overlapping annotations.

Referring back to FIG. 2, in some embodiments, labeling a line defect may include specifying the class of defect. For example, a target training process may involve training the machine learning model to detect m-classes of objects or defects, such as line defects. For each class, the user may use a different color to denote the class of the defect. Accordingly, the annotations provided by the user for labeling a line defect may be a separate color from the rest of the annotated defects. In this manner, the machine learning model may learn how to classify defects, in addition to detecting the defects.

In some embodiments, labeling module 216 may adjust the labels generated by user device 202. For example, labeling module 216 may be configured to adjust the labels to a standardized format. In some embodiments, the standardized format may include one or more of a shape and size of the annotation. For example, some machine learning models may require annotations to be in form of a bounding box. All the information associated with the original annotations (e.g., pre-transformation/translation) may be stored as meta information for the annotations. This allows the images to be used across multiple annotation formats.

In some embodiments, such as that discussed in U.S. Pat. No. 11,727,672, which is incorporated by reference herein, labeling module 216 may adjust the labels generated by user device 202 in accordance with a tagging profile and/or error profile associated with a user. For example, based on a learned tagging profile and/or error profile, labeling module 216 may convert or adjust the user's annotations into a standardized format prior to training machine learning model.

Training module 218 may be configured to train machine learning model 226 to detect line defects using the labeled image sets generated by user device 202 via data labeling module 216. In some embodiments, machine learning model 226 may be representative of a ResNet based machine learning architecture. In some embodiments, machine learning model 226 may be representative of a transformer based architecture. In some embodiments, machine learning model 226 may be representative of other machine learning models, such as, but are not limited to, random forest model, support vector machines, neural networks, deep learning models, Bayesian algorithms, Temporal Convolutional Networks, and the like.

As output, training module 218 may generate a trained model 220 to be deployed to detect line defects on future specimens. Exemplary specimens may include, but are not limited to, substrates, photomasks, optical lenses, and lithography plates.

Those skilled in the art understand that, in some embodiments, rather than having the components associated with application 212 centrally hosted, such as via back-end computing system 204, labeling module 216, training module 218, and/or trained model 220 may exist locally on user device 202. In other words, rather than rely on communications with web client application server 214 for accessing functionality of data labeling module 216, training module 218, and/or trained model 220, a user may access such functionality locally via user device 202, without needing to be connected to network 205.

Figures 3A, 3B:
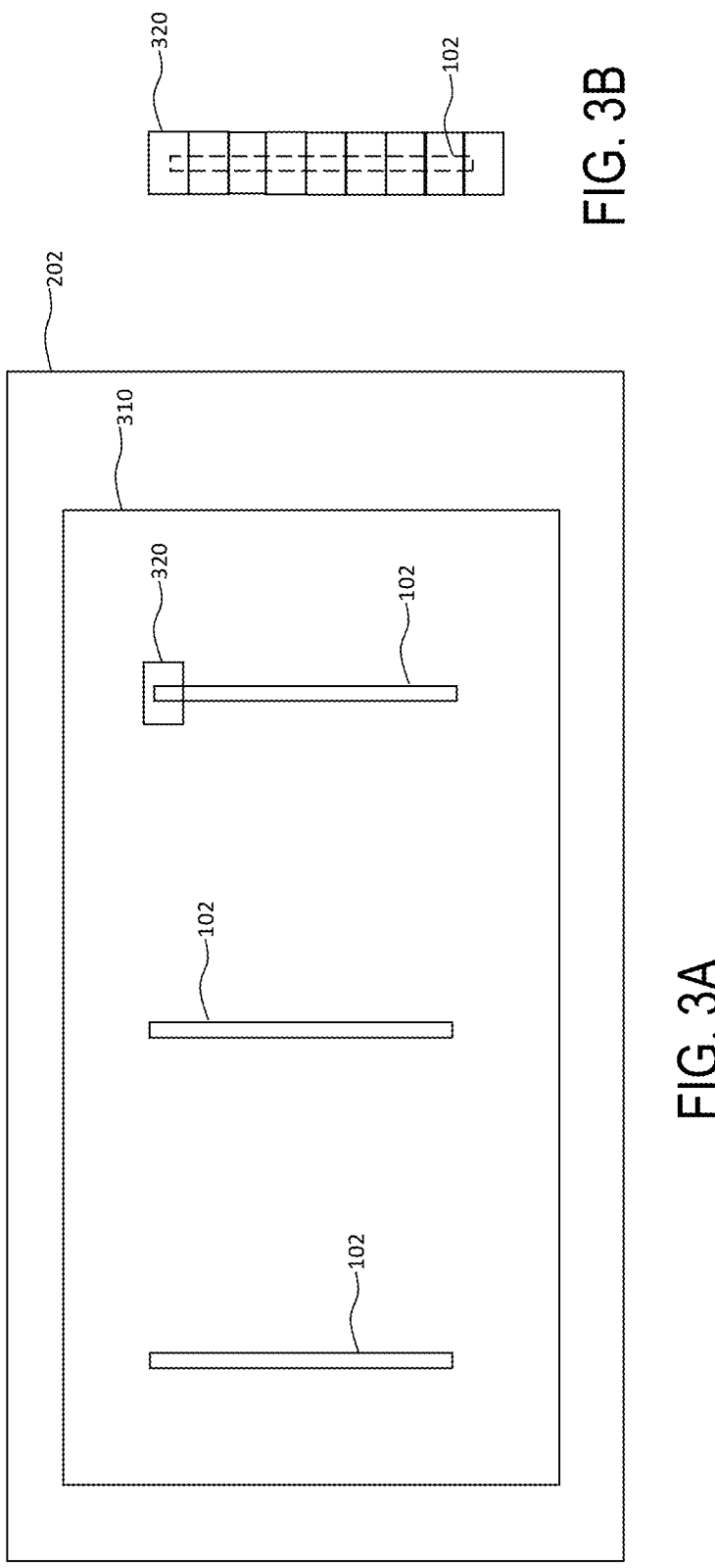
FIG. 3A illustrates an image captured of a specimen with a line defect labeled, according to example embodiments of the present disclosure.
FIG. 3B illustrates a line defect labeled in its entirety, according to example embodiments of the present disclosure.

FIG. 3A illustrates an image 310 captured of a specimen with a line defect 102 labeled, according to example embodiments.

As shown, user device 202 may take the form of a touchscreen device, such as, but not limited to, a tablet, mobile device, laptop, and the like. User device 202 may include an input interface. In some embodiments, an input interface is provided. A user of user device 202 may use an input device, such as their hand (e.g., at least one finger) or a stylus (e.g., smart pencil device), to provide input to user device 202 via the input interface. In this manner, by simply annotating the image, the user may provide input in the form of where the line defect 102 is located on the image 310.

In some embodiments, the line defect 102 may be annotated by the user with multiple annotations 320 labeled across it. For example, a light ring assembly (not pictured) may illuminate the specimen 100 to take an image 310. Although one image 310 is illustrated in FIG. 3A, more images 310 may be taken using an illumination system. Within the image 310, the line defect 102 is visible. The user may draw a small annotation 320 around a portion of the line defect 102 on the user device 202. The user may make multiple annotations 320 across the entire length of the line defect 102. The user may either copy and paste the annotation 320 to cover the length of the line defect or use a point and click method to make multiple annotations 320.

FIG. 3B illustrates a line defect 102 labeled in its entirety with annotations 320, according to an embodiment.

The annotations 320 may extend the entire length of line defect 102. Here, the line defect 102 is shown dashed for merely illustration purposes. The annotations 320 cover the line defect 102 in its entirety. This may be done for every line defect 102 that is seen in the image 310. Depending on the length of the line defect 102, thousands of annotations may be created across the image 310.

By creating multiple annotations 320 around the line defect 102, the user is effectively tricking the machine learning model to detect the line defect by detecting a multiple individual defects along the length of the line defect. In some embodiments, labeling module 216 may allow for auto-completion of labeling a line defect. For example, based on a color the user selected or a setting, the user can define a starting point of a line defect using a first annotation and an end point of the line defect using the second annotation. Based on this input, labeling module 216 may automate the process of drawing a plurality of annotations along the length of the line defect between the first annotation and the second annotation. In some embodiments, a user may assist with this process by drawing a line between the first annotation and the second annotation to indicate where the plurality of annotations should be populated.

In some embodiments, using this approach, a machine learning model may also be able to determine attributes of the detected line defect. For example, by labeling line defect 102 with multiple annotations 320, the machine learning model may be trained to determine the length and depth of the line defect.

Despite applying this technique to a defect such as a line defect 102, this technique may also be applied to area type defects. An area may be labeled with multiple annotations to get one large label that may canvas the entire area.

Figure 4:
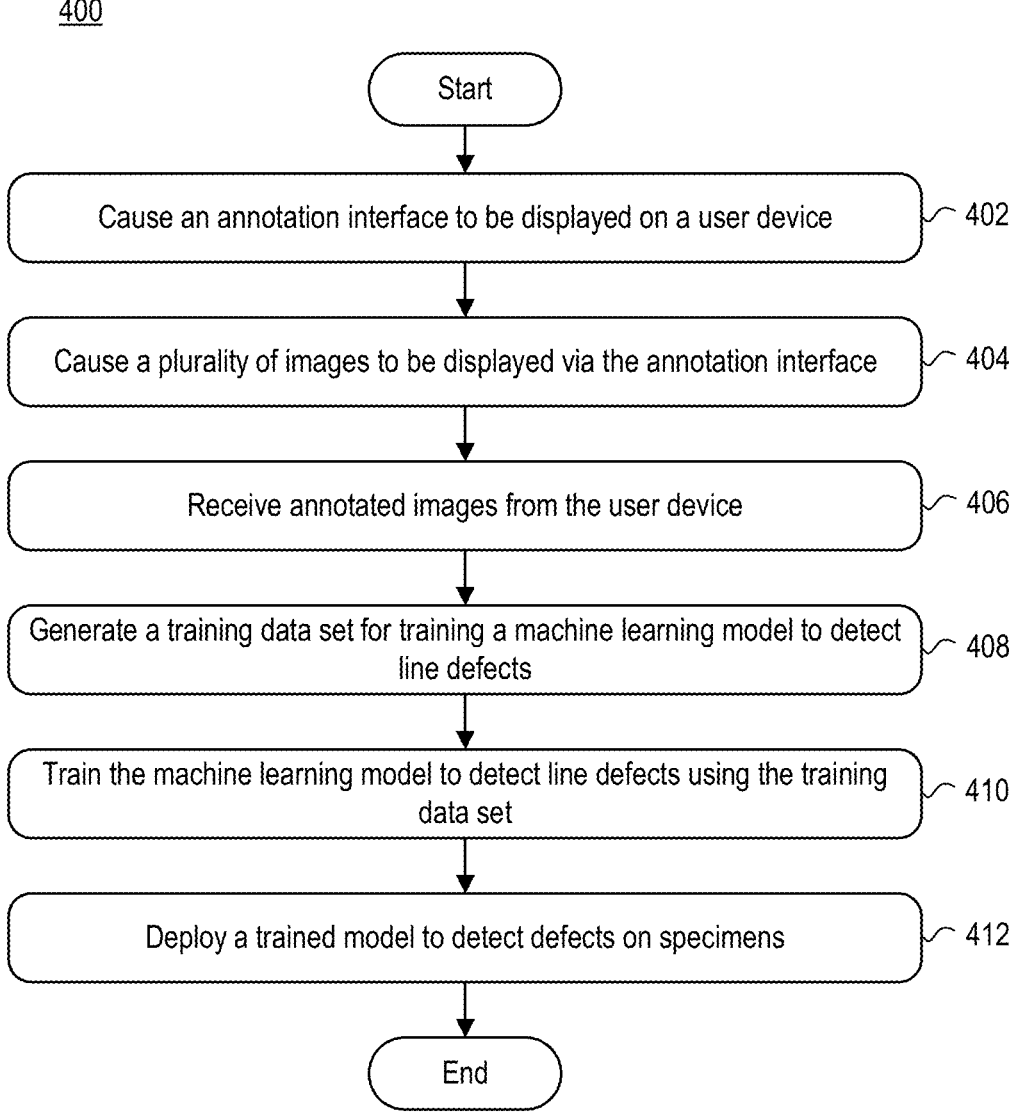
FIG. 4 is a flowchart for a method for detecting line defects on a specimen using a trained machine learning model, according to example embodiments of the present disclosure.

FIG. 4 is a flowchart for a method 400 for detecting line defects on a specimen using a trained machine learning model, according to example embodiments. Method 400 may begin at step 402.

At step 402, back-end computing system 204 may cause an annotation interface to be displayed to a user via application 212 executing on user device 202. The annotation interface may allow the user to review images of specimens, identify defects present on the specimens, and label the defects present thereon.

At step 404, back-end computing system 204 may cause a plurality of images to be displayed to via user device 202 for annotation. For example, labeling module 216 may provide a set of images (e.g., image 310) of specimens for the user to annotate. Generally, the set of images may include images of specimens that have a line defect present thereon. In some embodiments, each image may include other defects present thereon in addition to or in lieu of the line defect.

At step 406, back-end computing system 204 may receive annotated images from user device 202. For example, as discussed above, the user may annotate each image in the set of images with annotations that indicate the presence of a defect. The annotated images may include at least one annotation corresponding to a line defect. For example, a labeled image may include a plurality of annotations that span a length of a line defect to signal the presence of a line defect. In some embodiments, the annotated images may be color-coded to indicate a class of defect represented by the annotation. For example, the plurality of annotations that span a length of a line defect may be labeled a first color, while other defects that are not line defects may be labeled using a second color. In some embodiments, user device 202 may be configured to receive annotations via a stylus or a finger.

At step 408, back-end computing system 204 may generate a training data set for training a machine learning model to detect line defects. For example, labeling module 216 may compile the annotated set of images received by user device 202. In some embodiments, labeling module 216 may perform one or more standardization processes on the annotations generated by the user. For example, labeling module 216 may standardize the user's labels to a predefined shape and/or size. In some embodiments, generating the training data set may include labeling module 216 allocating the annotated set of images between a training data set and a test data set.

At step 410, back-end computing system 204 may train a machine learning model to detect line defects based on the training data set. For example, using the training data set, training module 218 may train machine learning model 226 to detect line defects. Generally, training module 218 may train machine learning model 226 until machine learning model 226 exhibits a threshold level of accuracy in detecting line defects. In some embodiments, training machine learning model 226 may include iteratively updating weights and/or hyperparameters of machine learning model 226 until the threshold level of accuracy is achieved.

Although the above process focuses on detecting line defects, those skilled in the art understand that such training process may result in machine learning model 226 learning to detect defects other than line defects. In some embodiments, machine learning model 226 may be representative of a pre-trained machine learning model that was previously trained to identify defects other than line defects. Thus, the above training process may be performed to supplement or expand the knowledge of machine learning model 226 to include the detection and/or classification of line defects.

At step 412, back-end computing system 204 may deploy a trained model to detect defects on a surface of a specimen. For example, once training module 218 determines that machine learning model 226 has achieved a threshold level of accuracy, training module 218 may output trained model 220. Trained model 220 may then be deployed or hosted on back-end computing system 204. For example, back-end computing system 204 may then utilize trained model 220 in real-time, near real-time, or periodically to detect and/or classify defects in an unannotated image of a specimen.

Figures 6A, 6B:
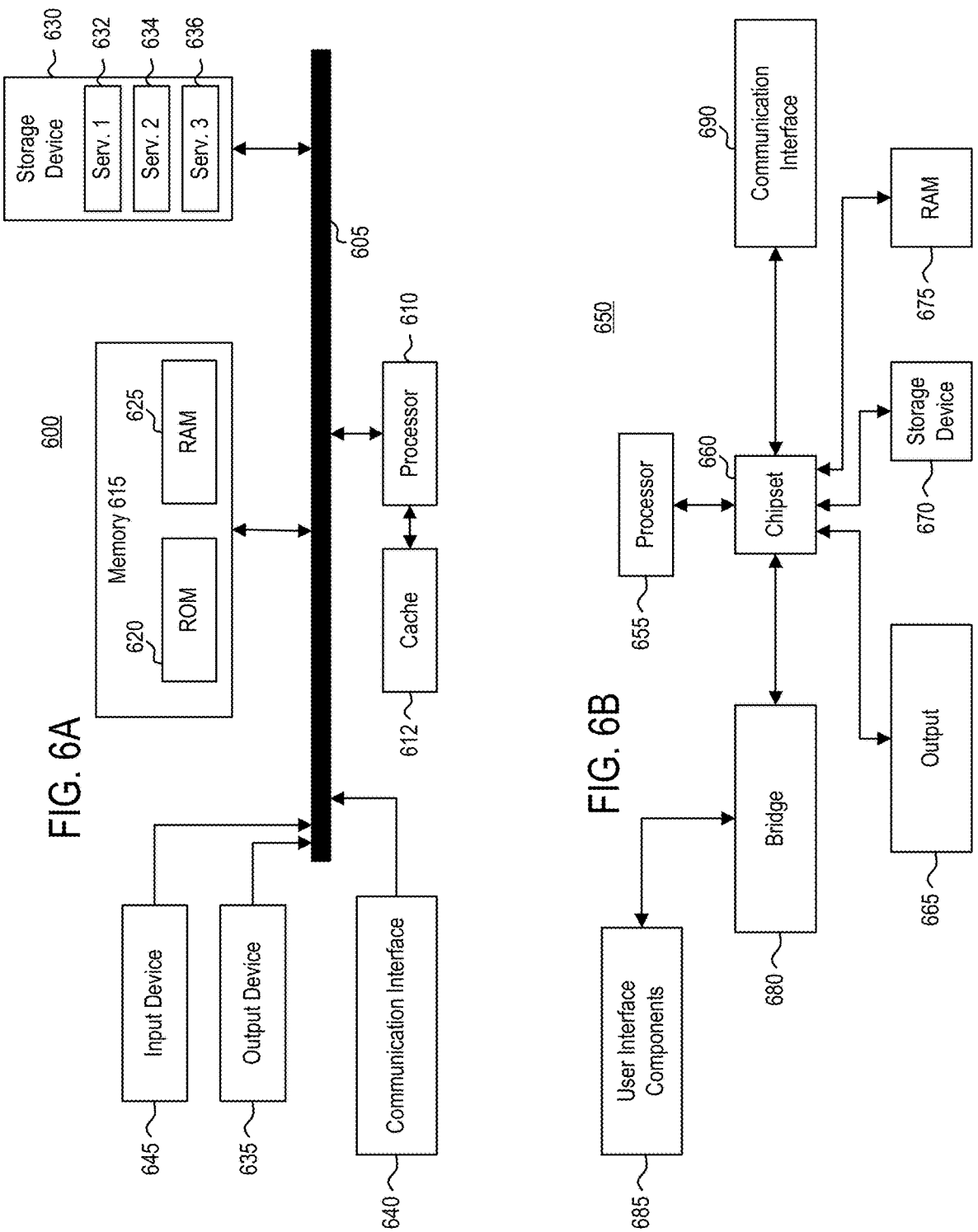
FIG. 6A is a block diagram illustrating a computing device, according to example embodiments of the present disclosure.
FIG. 6B is a block diagram illustrating a computing device, according to example embodiments of the present disclosure.

FIG. 6A illustrates a system bus architecture of computing system 600, according to example embodiments. System 600 may be representative of at least an inspection system or a computing system 204. One or more components of system 600 may be in electrical communication with each other using a bus 605. System 600 may include a processing unit (CPU or processor) 610 and a system bus 605 that couples various system components including the system memory 615, such as read only memory (ROM) 620 and random-access memory (RAM) 625, to processor 610.

System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general-purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system 600, an input device 645 may represent any number of input mechanisms, such as a microphone for speech, a touch-sensitive screen for gesture or graphical input, keyboard, mouse, motion input, speech and so forth. An output device 635 may also be one or more of a number of output mechanisms known to those of skill in the art. In some instances, multimodal systems may enable a user to provide multiple types of input to communicate with computing system 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635 (e.g., display), and so forth, to carry out the function.

FIG. 6B illustrates a computer system 650 having a chipset architecture that may represent at least an inspection system or a computing system 204. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655.

In this example, chipset 660 outputs information to output 665, such as a display, and may read and write information to storage device 670, which may include magnetic media, and solid-state media, for example. Chipset 660 may also read data from and write data to storage device 675 (e.g., RAM). A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage device 670 or storage device 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A computer-implemented method comprising:
generating, by a computing system, a training data set for training a machine learning model to detect line defects on a surface of a specimen, the generating comprising:
causing an annotation interface to be displayed to a user via a user device of the user, the annotation interface configured for receiving annotations indicating a presence of a defect,
causing presentation of a plurality of training images via the annotation interface on the user device, wherein each training image of the plurality of training images comprises a line defect,
receiving annotated images from the user device via the annotation interface, wherein each line defect is annotated using a plurality of annotations that extend between a starting point of the line defect to an end point of the line defect, wherein the annotated images form the training data set;
training, by the computing system, the machine learning model to detect line defects based on the training data set, wherein the machine learning model is trained to detect line defects by detecting individual defects represented by the plurality of annotations extending between the starting point and the end point;
determining, by the computing system, that the machine learning model has exceeded a threshold level of accuracy; and
based on the determining, deploying, by the computing system, the machine learning model to detect line defects on future specimens.

2. The computer-implemented method of claim 1, wherein generating the training data set comprises:
automatically adjusting the plurality of annotations to a standard shape or standard size.

3. The computer-implemented method of claim 1, further comprises:
for a training image,
detecting a first annotation corresponding to a first starting point of a first line defect, detecting a second annotation corresponding to a first end point of the first line defect, and
automatically populating a plurality of annotations between the first annotation and the second annotation.

4. The computer-implemented method of claim 3, further comprising:
detecting a presence of an annotated line between the first annotation and the second annotation; and
populating the plurality of annotations between the first annotation and the second annotation along the annotated line.

5. The computer-implemented method of claim 1, wherein each of the plurality of annotations corresponding to the line defects are of a first color.

6. The computer-implemented method of claim 5, wherein the annotated images further comprise additional annotations corresponding to defects that are not line defects, each of the additional annotations formed from a second color.

7. The computer-implemented method of claim 6, wherein training, by the computing system, the machine learning model to detect line defects based on the training data set comprises:
training the machine learning model to classify the line defects based on the first color and the second color.

8. A system, comprising:
a processor; and
a memory having programming instructions stored thereon, which, when executed by the processor, causes the system to perform operations comprising:
generating a training data set for training a machine learning model to detect line defects on a surface of a specimen, the generating comprising:
causing an annotation interface to be displayed to a user via a user device of the user, the annotation interface configured for receiving annotations indicating a presence of a defect,
causing presentation of a plurality of training images via the annotation interface on the user device, wherein each training image of the plurality of training images comprises a line defect,
receiving annotated images from the user device via the annotation interface, wherein each line defect is annotated using a plurality of annotations that extend between a starting point of the line defect to an end point of the line defect, wherein the annotated images form the training data set;
training the machine learning model to detect line defects based on the training data set, wherein the machine learning model is trained to detect line defects by detecting individual defects represented by the plurality of annotations extending between the starting point and the end point;
determining that the machine learning model has exceeded a threshold level of accuracy; and
based on the determining, deploying the machine learning model to detect line defects on future specimens.

9. The system of claim 8, wherein generating the training data set comprises:
automatically adjusting the plurality of annotations to a standard shape or standard size.

10. The system of claim 8, wherein the operations further comprise:
for a training image,
detecting a first annotation corresponding to a first starting point of a first line defect, detecting a second annotation corresponding to a second end point of the first line defect, and automatically populating a plurality of annotations between the first annotation and the second annotation.

11. The system of claim 10, wherein the operations further comprise:

detecting a presence of an annotated line between the first annotation and the second annotation; and populating the plurality of annotations between the first annotation and the second annotation along the annotated line.

12. The system of claim 8, wherein each of the plurality of annotations corresponding to the line defects are of a first color.

13. The system of claim 12, wherein the annotated images further comprise additional annotations corresponding to defects that are not line defects, each of the additional annotations formed from a second color.

14. The system of claim 13, wherein training the machine learning model to detect line defects based on the training data set comprises:

training the machine learning model to classify the line defects based on the first color and the second color.

15. A non-transitory computer readable medium having one or more sequences of instructions stored thereon, which, when executed by a processor, causes a computing system to perform operations comprising:

generating, by the computing system, a training data set for training a machine learning model to detect line defects on a surface of a specimen, the generating comprising:

causing an annotation interface to be displayed to a user via a user device of the user, the annotation interface configured for receiving annotations indicating a presence of a defect, causing presentation of a plurality of training images via the annotation interface on the user device, wherein each training image of the plurality of training images comprises a line defect, receiving annotated images from the user device via the annotation interface, wherein each line defect is annotated using a plurality of annotations that extend between a starting point of the line defect to an end point of the line defect, wherein the annotated images form the training data set;

training, by the computing system, the machine learning model to detect line defects based on the training data set, wherein the machine learning model is trained to detect line defects by detecting individual defects represented by the plurality of annotations extending between the starting point and the end point;

determining, by the computing system, that the machine learning model has exceeded a threshold level of accuracy; and based on the determining, deploying, by the computing system, the machine learning model to detect line defects on future specimens.

16. The non-transitory computer readable medium of claim 15, further comprises:

for a training image, detecting a first annotation corresponding to a first starting point of a first line defect, detecting a second annotation corresponding to a second end point of the first line defect, and automatically populating a plurality of annotations between the first annotation and the second annotation.

17. The non-transitory computer readable medium of claim 16, further comprising:

detecting a presence of an annotated line between the first annotation and the second annotation; and populating the plurality of annotations between the first annotation and the second annotation along the annotated line.

18. The non-transitory computer readable medium of claim 15, wherein each of the plurality of annotations corresponding to the line defects are of a first color.

19. The non-transitory computer readable medium of claim 18, wherein the annotated images further comprise additional annotations corresponding to defects that are not line defects, each of the additional annotations formed from a second color.

20. The non-transitory computer readable medium of claim 19, wherein training, by the computing system, the machine learning model to detect line defects based on the training data set comprises:

training the machine learning model to classify the line defects based on the first color and the second color.

* * * * *